(12) United States Patent
Schüler

(10) Patent No.: US 6,443,885 B1
(45) Date of Patent: Sep. 3, 2002

(54) PROCESS FOR OPERATING AN INCUBATOR

(75) Inventor: Hans Ulrich Schüler, Lübeck (DE)

(73) Assignee: Dräger Medizintechnik GmbH (DE)

( * ) Notice: Subject to any disclaimer, the term of this patent is extended or adjusted under 35 U.S.C. 154(b) by 12 days.

(21) Appl. No.: 09/639,721

(22) Filed: Aug. 16, 2000

(30) Foreign Application Priority Data

Dec. 17, 1999 (DE) .......................................... 199 60 989

(51) Int. Cl.$^7$ ............................................... A61G 11/00
(52) U.S. Cl. ......................................................... 600/22
(58) Field of Search ............................ 600/22, 21, 549; 702/131

(56) References Cited

U.S. PATENT DOCUMENTS

| | | | |
|---|---|---|---|
| 3,338,233 A | * 8/1967 | Grosholz et al. | 600/22 |
| 3,920,000 A | 11/1975 | Atherton et al. | |
| 4,750,474 A | * 6/1988 | Dukhan et al. | 600/22 |
| 5,162,038 A | * 11/1992 | Wilker | 600/22 |
| 5,844,862 A | * 12/1998 | Cocatre-Zilgien | 600/549 |
| 6,036,634 A | * 3/2000 | Goldberg et al. | 600/22 |

FOREIGN PATENT DOCUMENTS

DE 198 188 170 A1 10/1999

* cited by examiner

*Primary Examiner*—Eric F. Winakur
*Assistant Examiner*—David McCrosky
(74) *Attorney, Agent, or Firm*—McGlew and Tuttle, P.C.

(57) ABSTRACT

A process for operating an incubator particularly suitable for a certain type of care ("kangaroo care") is disclosed. The process is activated by device of an input element at a time $t_0$. A measuring and control unit controls the heating device as a function of the temperature measured by the temperature sensor, of which there is at least one, in the interior space of the incubator such that the temperature measured in the interior space of the incubator during a preceding time period $t_0-t_1$ is used as the set point for the temperature in the interior space of the incubator. The skin temperature of the patient, which is determined by the second temperature sensor is compared with preset upper and/or lower temperature limit values for the skin temperature and an alarm is triggered by the measuring and control unit when these limit values are overshoot and/or undershot. An alarm circuit triggers an alarm as a function of the opening of the incubator and the associated temperature change in the incubator. This is deactivated for the period $t_2-t_1$ following $t_0$. The process is deactivated at the time $t_3$ by the input element.

20 Claims, 1 Drawing Sheet

PROCESS FOR OPERATING AN INCUBATOR

FIELD OF THE INVENTION

The present invention pertains to a process for operating an incubator with at least one first temperature sensor for determining the temperature $T_1$ in the interior space of the incubator, at least one second temperature sensor for determining the skin temperature $T_2$ of the patient, a heating means for the incubator, and a measuring and control unit.

BACKGROUND OF THE INVENTION

A process is described in DE 198 18 170 A1 according to which operating variables or parameters are determined for controlling the incubator from the linking of the temperatures measured on two skin areas of a patient, which skin areas have different temperatures, and the air temperature measured in the interior space of the incubator.

U.S. Pat. No. 3,920,000 shows a device in which a plurality of temperature sensors are linked with a downstream heating device via a measuring and control unit such that the heating device is switched off when a temperature limit value determined from the measured temperature values is exceeded.

Two different modes of operation have become successful for incubators so far in practice: According to the air temperature control, the set point of a preset air temperature in the interior of the incubator is compared with the measured value of a temperature sensor in the interior space of the incubator and the air temperature is set by a heating device as a function of the comparison. In the case of an air temperature exceeding a defined temperature limit value in the interior space of the incubator, the medical care personnel receives an acoustic or optical alarm.

In the case of skin temperature control, the set point of a preset skin temperature of the patient in the incubator is compared with the measured values of at least one temperature sensor on the skin of the patient and the heating device is set correspondingly in order to indirectly compensate the temperature deviation of the patient from the set point. In the case of a deviation of the measured air temperature from a preset temperature limit value, an acoustic or optical alarm is triggered.

One essential drawback of the prior-art process arises when the small patient is removed from the incubator to lie in direct skin contact on the body of the farther or the mother. This type of external care is called "kangaroo care".

The skin temperature control leads to meaningless or even dangerous results in this case, because the incubator is set at false temperature values which are not caused by the temperature in the interior space of the incubator, due to the skin temperature sensors being on the outside. As a result, the patient is either heated or cooled too strongly when he is returned into the incubator. If the incubator is switched, instead, to the air temperature control mode before the beginning of the "kangaroo" care, the skin temperature is not monitored, because the skin temperature alarm is active only when the incubator is operated by device of the skin temperature control. An air temperature alarm is frequently triggered at the same time, because the incubator is opened to remove the patient, so that cold air enters the incubator from the environment. However, this air temperature alarm is superfluous because the patient is already outside the incubator, so that the alarm must be switched off manually by depressing a corresponding operating control button.

SUMMARY AND OBJECTS OF THE INVENTION

The primary object of the present invention is to provide a process for operating an incubator which overcomes the drawbacks of the prior-art processes and makes possible the safe and reliable operation of the incubator.

According to the invention, a process and system are provided. The process and system are for operating an incubator with at least one first temperature sensor for determining the temperature $T_1$ in the interior space of the incubator, at least one second temperature sensor for determining the skin temperature $T_2$ of the patient, a heating means for the incubator, and a measuring and control unit. The process is activated by means of an input element at a time $t_0$. The measuring and control unit regulates the heating device as a function of the temperature measured by means of a temperature sensor in the interior space of the incubator. The temperature measured in the interior space of the incubator during a preceding time period $t_0$–$t_1$ is used as the set point for the temperature in the interior space of the incubator. The skin temperature of the patient, which is determined by means of second temperature sensors, is compared with preset upper and/or lower temperature limit values for the skin temperature, An alarm is triggered by the measuring and control unit when limit values are overshot and/or undershot. An alarm circuit triggers an alarm as a function of the opening of the incubator and the associated temperature change in the incubator is deactivated for over a period $t_2$–$t_0$ following $t_0$. The process is deactivated at the time $t_3$ by means of the input element.

One or two temperature sensors may be used to determine the skin temperature of the patient and an alarm is triggered when the preset upper temperature limit values are exceeded. In the case of the presence of at least two second temperature sensors (to determine the sidn temperature), an alarm is triggered as a function of the comparison of the difference between the skin temperatures measured therewith and preset set points for the temperature difference.

The alarms may be deactivated during a period of up to 5 to 15 minutes after the time $t_0$. The time periods $t_0$–$t_1$ and $t_2$–$t_0$ may comprise 1 to 15 minutes.

One essential advantage of the process according to the present invention is obtained due to the fact that the operation of an incubator becomes possible and false alarms are avoided under the above-described special conditions of the temporary removal of the patient from the incubator. This is accomplished with a structure that is known per se.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
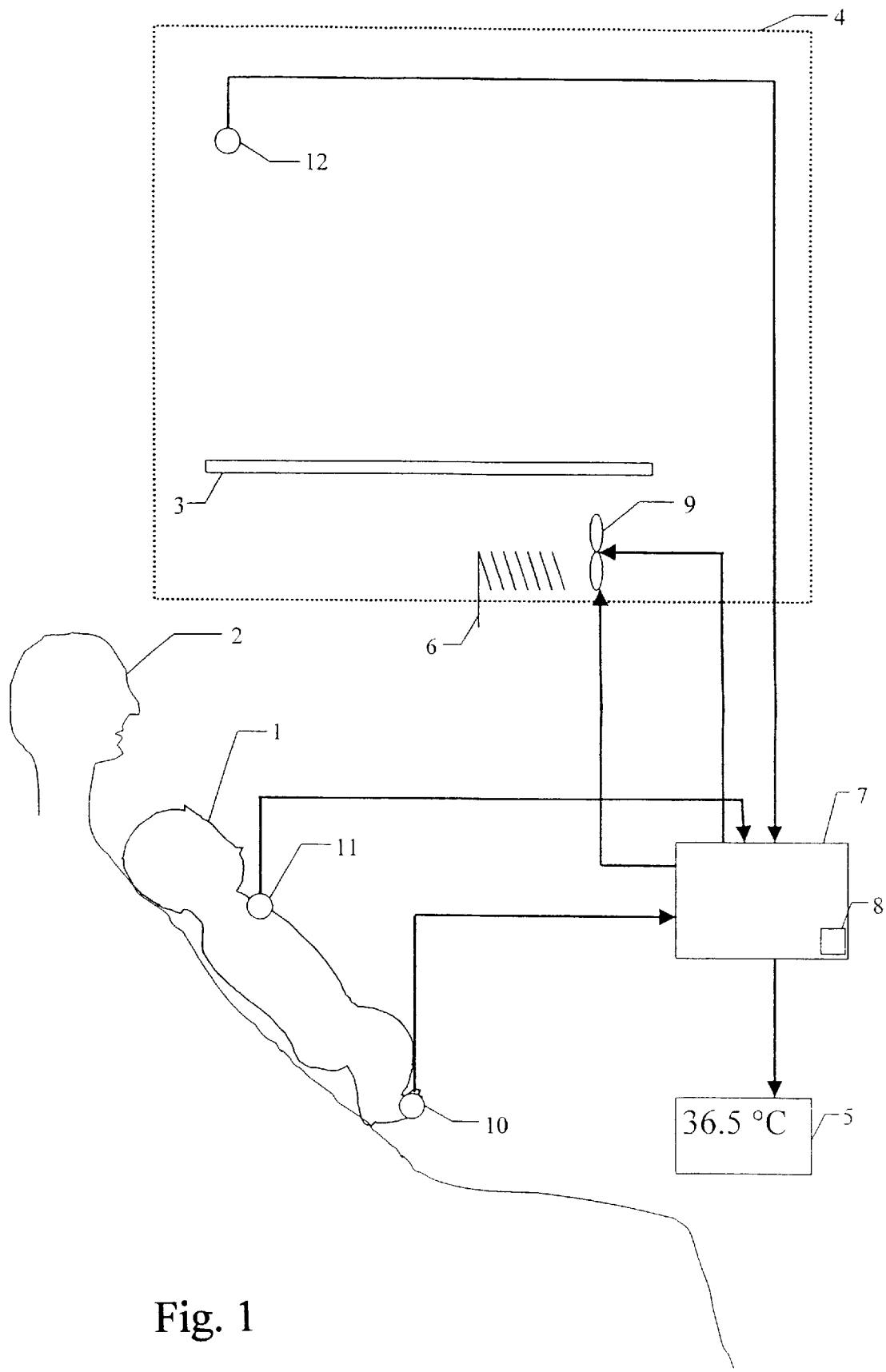
FIG. 1 is a schematic view showing an arrangement with known components for a process for operating an incubator for premature or newborn infants according to the invention.

Referring to the drawings in particular, the invention comprises a process and system using an arrangement with known components for operating an incubator. The incubator 4 is for a premature or newborn baby (patient) 1. The patient 1 is located on a lying surface 3 under the normal operating conditions. A first temperature sensor 12 measures the temperature $T_1$ of the air and sends it to the measuring and control unit 7. The measuring and control unit 7 is particularlly a central measuring and control unit. The first temperature sensor 12 is located in the interior space of the incubator 4. As in the case of the prior-art air temperature control, the heating means has a fan or ventilator system 9 and an electric heater 6 is used as the adjusting element. The temperature is set as a function of a preset set point for the air temperature. The skin temperature $T_2$ of the patient 1 is determined by means of a second temperature sensor 10, optionally also by means of two second temperature sensors 10, 11. Corresponding measured signals are sent to the measuring and control unit 7. In the case of at least two second temperature sensors 10, 11, these are preferably positioned on different skin areas having different temperatures. The measured signals are processed in the measuring and control unit 7 by means of suitable evaluating logarithms to form adjusting signals for the heating means 6, 9. The measured or preset temperature values are displayed by means of a display unit 5.

The process according to the present invention is used especially advantageously in cases in which, as was described, the patient 1 is removed from the incubator 4 by means of an opening flap, not shown, which is to be opened, in order to lie in direct skin contact on the body of the father or the mother 2 ("kangaroo care"). The process of the external care or "kangaroo care" mode is first activated by means of an entry or input element 8 via the measuring and control unit 7 at a time $t_0$.

The measuring and control unit 7 regulates the heating means 6, 9 as a function of the temperature $t_1$ measured by means of the first temperature sensor 12 in the interior space of the incubator 4. Especially the mean value or another value determined by calculation, e.g., the median from the air temperatures measured in the interior of the incubator 4 over preceding time period $t_0$–$t_1$, is used for this as the set point for the temperature $T_1$ of the air in the interior space of the incubator 4. The time period $t_0$–$t_1$ comprises about 1 to 15 minutes, especially 5 to 10 minutes. The skin temperature $T_2$ of the patient 1, determined by means of the second temperature or especially by means of the two second temperature sensors 10, 11 is compared in the measuring and control unit 7 with an upper and/or lower, preset temperature limit value for the skin temperature $T_2$, and an acoustic or visually perceptible alarm is triggered by the measuring and control unit 7 when the actual value overshoots and/or undershoots (is higher and/or lower) than the limit values. An alarm circuit, which triggers an alarm as a function of the opening of the incubator by means of the opening flap and the associated temperature change the interior space of the incubator 4, is additionally deactivated for a time period $t_2$–$t_0$ of about 1 to 15 minutes following $t_0$. This prior-art alarm circuit is designed. in general, such that an alarm is triggered even in the case of great measured changes in the air humidity and the oxygen concentration and after comparison with the preset points. Finally, the process according to the present invention is deactivated at the time $t_3$ by means of the input elements 8. The known skin temperature or the air temperature control is then activated, depending on the wishes of the operator, because the patient 1 has been returned onto the lying surface 3 in the incubator 4. The process according to the present invention is used, in general, for the time periods $t_3$–$t_0$ of typically 10 to 40 minutes, depending on the treatment situation of the particular care being administered. $t_3$–$t_0$ may be shorter than, equal to or greater than $t_2$–$t_0$.

In a preferred embodiment, the process according to the present invention the skin temperature alarms are deactivated during a time period $t_2$–$t_0$ of up to 5 to 15 minutes after the start of the process at the time $t_0$. This is meaningful because the temperature limit values for the skin temperature $T_2$ may be briefly overshot or undershot for physiological reasons during this period because of the transfer of small patient 1 without a problematic condition developing which would make necessary an alarm.

While specific embodiment of the invention have been shown and described in detail to illustrate the application of the principles of the invention, it will be understood that the invention may be embodied otherwise without departing from such principles.

What is claimed is:

1. A process for operating an incubator with at least one first temperature sensor for determining the temperature $T_1$ in the interior space of the incubator, at least one second temperature sensor for determining the skin temperature $T_2$ of the patient, a heating device for heating the incubator, and a measuring and control unit, the process comprising the step of:

activating the process with an input element at a time $t_0$;

regulating the heating device with the measuring and control unit as a function of the temperature measured by the temperature sensor in the interior space of the incubator such that the temperature measured in the interior space of the incubator during the time period $t_0$–$t_1$ preceding said activating of the process is used as the set point for the temperature in the interior space of the incubator;

comparing the skin temperature of the patient, detected by the second temperature sensors, with preset upper and/or lower temperature limit values for the skin temperature and triggering an alarm via the measuring and control unit when these limit values are overshot or undershot;

providing an alarm circuit which triggers an alarm as a function of the opening of the incubator and the associated temperature change in the incubator and deactivating the alarm circuit over a period $t_2$–$t_0$ following $t_0$; and deactivating the process at the time $t_3$ with the input element.

2. A process in accordance with claim 1, wherein two temperature sensors are used to determine the skin temperature of the patient and an alarm is triggered when the preset upper temperature limit values are exceeded.

3. A process in accordance to claim 2, wherein an alarm is triggered when a difference between the skin temperatures measured with said two temperature sensors exceeds preset set points for the temperature difference.

4. A process in accordance with claim 2, wherein the alarms for the skin temperature are deactivated during a period to 5 to 15 minutes after the time $t_0$.

5. A process in accordance with claim 1, wherein the alarms for the skin temperature are deactivated during a period to 5 to 15 minutes after the time $t_0$.

6. A process in accordance with claim 1, wherein the time periods $t_0$–$t_1$ and $t_2$–$t_0$ comprise 1 to 15 minutes.

7. A process in accordance with claim 1, wherein further comprising:

reactivating the alarm cicuits after said step of the deactivating process.

8. A process in accordance with claim 1, wherein further comprising:
   measuring the air temperature in the interior space prior to said activating of the process;
   using the air temperature as the set point.

9. A process in accordance with claim 1, wherein:
   the process activated and deactivated with the input element is an external care process.

10. A process for controlling an incubator, the process comprising the steps of:
    measuring an air temperature in the incubator;
    measuring the skin temperature of a patient using the incubator;
    controlling air temperature in the incubator based on said measured air temperature, said measured skin temperature, or both said air temperature and said skin temperature;
    comparing said measured skin temperature with a skin temperature range;
    indicating a skin temperature alarm if said measured skin temperature is outside said skin temperature range;
    comparing said measured air temperature with an air temperature range;
    indicating an air temperature alarm if said measured air temperature is outside said air temperature range;
    activating an external care mode of the incubator, said external care including;
      controlling air temperature in the incubator based on said measured air temperature preceding said external care mode;
      deactivating said air temperature alarm;
      deactivating said external care mode.

11. A process in accordance with claim 10, wherein: said external care mode includes deactivating said skin temperature alarm.

12. A process in accordance with claim 10, wherein: said external care mode includes said deactivating of said air temperature alarm during initial portion of said external care mode, and activating said air temperature alarm during a final portion of said external care mode.

13. A process in accordance with claim 12, wherein: said activating of said skin temperature alarm occurs a predetermined amount of time after said activating of said external care mode.

14. A process in accordance with claim 10, wherein: said external care mode includes said deactivating of said air temperature alarm during an initial portion of said external care mode, and activating said air temperature alarm during a final portion of said external care mode.

15. A process in accordance with claim 14, wherein: said activating of said air temperature alarm occurs a predetermined amount of time after said activating of external care mode.

16. A process in accordance with claim 10, further comprising:
    indicating an open incubator alarm when the incubator is opened;
    deactivating said open incubator alarm during said external care mode.

17. A process in accordance with claim 10, wherein: said external care mode is activated by operating an input device of a control unit.

18. A process in accordance with claim 10, wherein: said external care mode activated and deactivated by operating an input device of a control unit.

19. A process in accordance with claim 10, wherein: said external care mode is deactivated a predetermined amount of time after said activating of said external mode.

20. A process in accordance with claim 10, wherein:
    after said deactivating of said external care mode,
    said air temperature in the incubator is controlled based on said measured air temperature, said measured skin temperature, or boat said air temperature and said skin temperature,
    said air temperature alarm is activated,
    said skin temperature alarm is activated.

* * * * *